US007742968B2

(12) United States Patent
Guler et al.

(10) Patent No.: US 7,742,968 B2
(45) Date of Patent: Jun. 22, 2010

(54) AUTOMATED DECISION SUPPORT SYSTEM FOR DESIGNING AUCTIONS

(75) Inventors: Kemal Guler, Cupertino, CA (US);
Leslie R. Fine, Menlo Park, CA (US);
Kay-Yut Chen, Santa Clara, CA (US);
Alan H. Karp, Palo Alto, CA (US);
Tongwei Liu, Redwood City, CA (US);
Hsiu-Khuern Tang, Menlo Park, CA (US); Fereydoon Safai, Los Altos Hills, CA (US); Ren Wu, San Jose, CA (US);
Alex Zhang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3047 days.

(21) Appl. No.: 09/858,251

(22) Filed: May 15, 2001

(65) Prior Publication Data

US 2002/0174052 A1 Nov. 21, 2002

(51) Int. Cl.
*G06Q 40/00* (2006.01)
(52) U.S. Cl. .............................. 705/37; 705/35; 705/36; 703/2; 715/738
(58) Field of Classification Search .................. 705/35, 705/36, 37, 14
See application file for complete search history.

(56) References Cited

U.S. PATENT DOCUMENTS

| 5,101,353 | A * | 3/1992 | Lupien et al. ................. 705/37 |
| 6,285,989 | B1 * | 9/2001 | Shoham ....................... 705/37 |
| 6,792,399 | B1 * | 9/2004 | Phillips et al. ............ 705/36 R |
| 6,868,525 | B1 * | 3/2005 | Szabo ......................... 715/738 |
| 6,871,190 | B1 * | 3/2005 | Seymour et al. .............. 705/37 |

OTHER PUBLICATIONS

Patrick Bajari and Ali Hortacsu, Auction Models When Bidders Make Small Mistakes: Consequences for Theory and Estimation, Aug. 15, 2001, Stanford University and University of Chicago.*
Econimetrica, A theory of Auctions and Competitive Bidding, Paul R. Milgrom, Sep. 1982.
Journal of Economic Literature, Auctions and Bidding, R. Preston McAfee, Jun. 1987, pp. 699-738.
Journal of Economic Perpspectives, Auctions and Bidding: A Primer, Paul Milgrom, Summer 1989, pp. 3-22.
Strategic Analysis of Auctions, Robert Wilson, Feb. 1990.
Structural Econometric Models of Strategic Behavior, Structural Analysis of Auction Data, Jean-Jacques Laffont.
Structural Econometrics of First-Price Auctions: A Survey of Methods, Isabelle Perrigne, Jun. 1999.

* cited by examiner

*Primary Examiner*—Charles R Kyle
*Assistant Examiner*—Siegfried E Chencinski

(57) ABSTRACT

A computer-implemented automated decision support system for designing an auction for a given item includes a structure extractor that estimates unknown elements of market structure of the auction based on auction characteristics data extracted from historical auctions for similar items and a bidding model matching the extracted auction characteristics data. The decision support system also includes a bidding behavior predictor that predicts bidding behaviors of bidders in the auction based on the estimated unknown elements of market structure and characteristics of the auction. In addition, the system includes an optimizer that employs an evaluation criterion to generate an evaluation of the auction based on (1) the estimated unknown elements of market structure and (2) the predicted bidding behavior of bidders. A method of providing an automated auction analysis is also described.

23 Claims, 10 Drawing Sheets

AUTOMATED DECISION SUPPORT SYSTEM FOR DESIGNING AUCTIONS

BACKGROUND OF THE INVENTION

1. Field of the Invention

The present invention pertains to auction designs and auction analysis. More particularly, this invention relates to an automated decision support system for designing and analyzing auctions.

2. Description of the Related Art

In an auction, the participants typically make a variety of decisions. In an auction run by a seller, a bidder has to decide on how to bid and whether or not to bid in a specific auction conditional on information the bidder has. In addition, the bidder needs to decide whether or not and how to gather information on auctions, objects, rivals, etc.

The auction house needs to decide fees for buyers and/or sellers. In addition, the auction house needs to decide the menu of auction mechanism to offer.

The seller has to make a number of decisions regarding the auction mechanism. This means that the seller typically makes a number of decisions to determine the specific auction procedure for designing and conducting the auction. The auction mechanism typically includes the auction format, the reserve price of the item to be auctioned, entry fees, quantity, timing and duration, lot size and bundling, sequence of lots, bid increments, information disclosure policy, participation rules, and preference/discrimination policy, etc. The auction format indicates the process by which the auction winner(s) and payments are determined. Standard auction formats include Dutch, English, first-price-sealed bid, Vickrey, etc.

The reserve price specifies the minimum or maximum acceptable price, depending on whether the auction is a selling auction or buying auction. If the auction is a selling auction, then the reserve price is the minimum acceptable price. If the auction is a buying auction, the reserve price indicates the maximum acceptable price. The entry fee is the fee a bidder is charged to participate in the auction. The participation rules specify how bidders can participate in the auction. For example, the participation rules can specify that the auction is an invitation only auction. As a further example, the participation rules may specify that participation is based on lottery draws.

For example, in an auction to sell an item (e.g., laser printer), the seller needs to determine, among other things, which auction format is to be employed in order to extract the maximum revenue from the auction. This is due to the fact that a particular auction format is better suited for a particular market environment than other auction formats. In other words, an English auction is better for some market environments, while in others, a first-price-sealed-bid auction is better. If a wrong auction format is selected by the seller, the revenue generated from the auction may be adversely affected.

In addition, once the seller has decided to employ a specific auction format, another important decision the seller typically needs to make is to set the reserve price below which no bid will be accepted. Again, the selection of the reserve price also affects the revenue generated from the auction. Estimates using field data from offshore oil lease auctions suggest that optimal reserve prices can increase auction revenues by more than 300%.

Currently, these decisions are left entirely to the person who runs the auction. In addition, uncertainty is intrinsic in all these decisions. This means that these decisions are person-dependent and typically optimality of these decisions cannot be ascertained. There is no systematic data analysis for the auction before the person can make the decisions. If the person making these decisions is experienced in auctions, then the decisions are likely to be optimal. If the person making these decisions is not experienced in auctions, then the decisions are likely not to be optimal.

Thus, there exists a need for an integrated estimation and optimization solution for making auction design decisions optimally based on structural econometric analysis of available data.

SUMMARY OF THE INVENTION

One feature of the present invention is to provide automated decision support for designing auctions.

Another feature of the present invention is to allow auction design decisions to be dynamically adjusted for specific situations.

A further feature of the present invention is to allow optimal configuration of auction design parameters and comparative evaluation of design choices.

Below described is a computer-implemented automated decision support system for designing an auction for a given item. The system includes a structure extractor that estimates unknown elements of market structure of the auction based on auction characteristics data extracted from historical auctions for similar items and a bidding model matching the extracted auction characteristics data. The decision support system also includes a bidding behavior predictor that predicts bidding behaviors of bidders in the auction based on the estimated unknown elements of market structure and characteristics of the auction. In addition, the system includes an optimizer that employs an evaluation criterion to generate an evaluation of the auction based on (1) the estimated unknown elements of market structure and (2) the predicted bidding behavior of bidders.

A method of providing an automated auction analysis is also described. The method includes the step of estimating unknown elements of market structure of the auction based on auction characteristics data extracted from historical auctions for similar items and a bidding model matching the extracted auction characteristics data. The method also includes the step of predicting bidding behaviors of bidders in the auction based on the estimated unknown elements of market structure and characteristics of the auction. Then an evaluation criterion is employed to generate an evaluation of the auction based on (1) the estimated unknown elements of market structure and (2) the predicted bidding behavior of bidders.

Other features and advantages of the invention will become apparent from the following detailed description, taken in conjunction with the accompanying drawings, illustrating by way of example the principles of the invention.

DETAILED DESCRIPTION OF THE INVENTION

Figure 1:
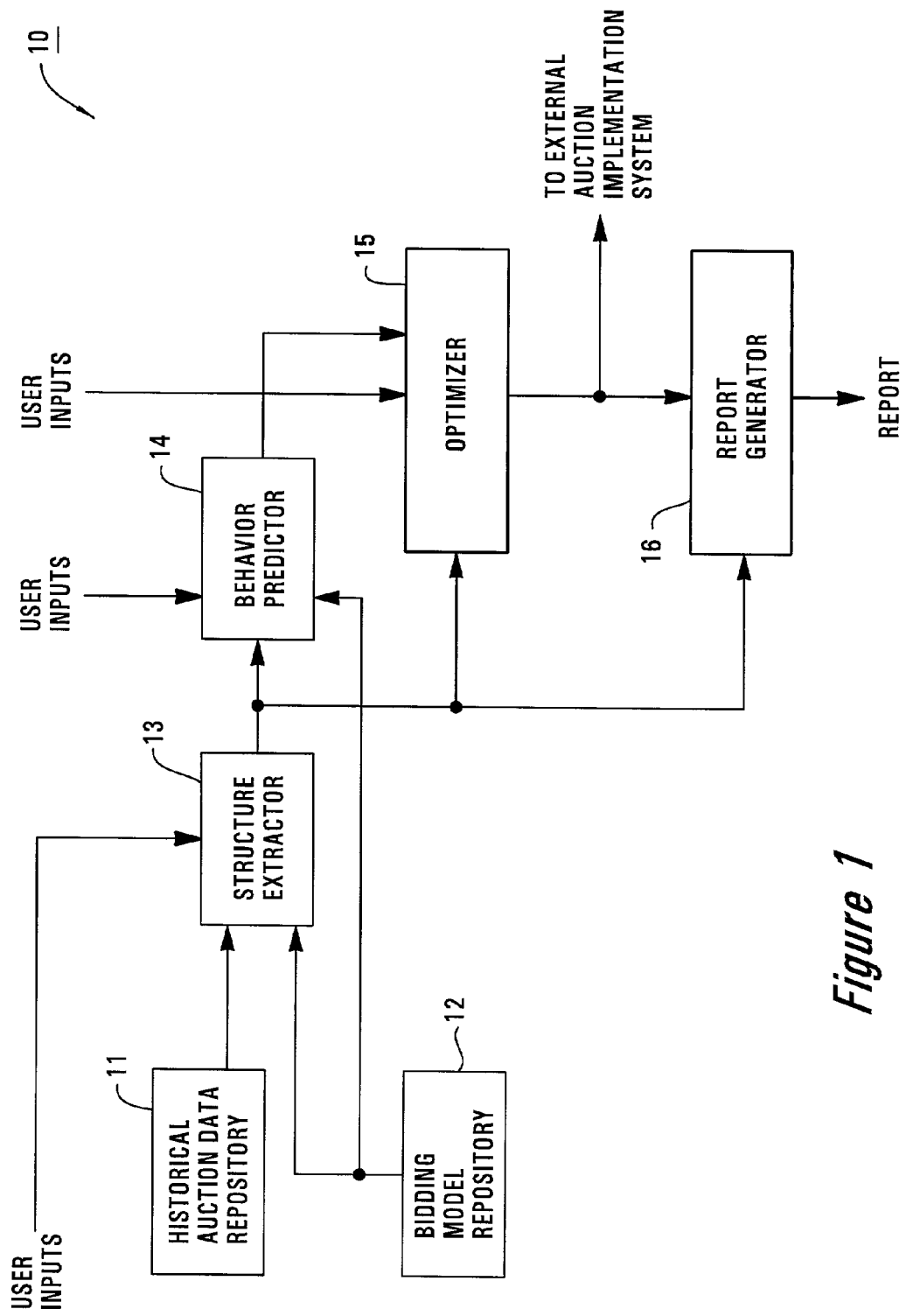
FIG. 1 schematically shows an automated decision support system for designing auctions in accordance with one embodiment of the invention.

FIG. 1 shows an automated decision support system 10 for designing auctions in accordance with one embodiment of the present invention. In one embodiment, the automated decision support system 10 is a software system implemented in a computer system. Alternatively, the automated decision support system 10 can be implemented by hardware or firmware.

The computer system that embodies the automated decision support system 10 can be any kind of computer system. For example, the computer system can be a main-frame computer system, a super computer system, a workstation computer system, a server computer system, or a personal computer system.

The automatic decision support system 10 is used to provide decision support for auction design. This means that the automatic decision support system 10 aids auction sellers, buyers, bidders, or auction houses in making auction-related decisions. As described above, there are typically a number decisions to be made regarding an auction. For example, in an auction run by a seller, a bidder has to decide on (1) how to bid and (2) whether or not to bid in a specific auction conditional on information the bidder has. In addition, the bidder needs to decide whether or not and how to gather information on auctions, objects, rivals. The auction house for the auction needs to decide fees for buyers and/or sellers. In addition, the auction house needs to decide the menu of auction mechanism to offer.

Similarly, in an auction run by a seller, the seller also has to decide what the reserve price of the auctioned item should be, what is the best auction format, what entry fees should be charged for participating in the auction, what timing and duration of the auction should be, the quantity of the item to be auctioned, what participation rules should govern the auction, and what information rules should be imposed to the auction, etc. As is known, these decisions affect the revenue or profit generated from the auction.

In order to achieve the maximum revenue or profit, these decisions must be optimized. In accordance with one embodiment of the present invention, this optimization is done by the automatic decision support system 10. The automatic decision support system 10 provides optimal configuration of auction design parameters and comparative evaluation of any pair of design choices. In other words, the automatic decision support system 10 provides automated auction analysis optimization.

In accordance with one embodiment of the present invention, the automatic decision support system 10 processes available data using structural econometric techniques to identify the latent distribution of random or unknown elements of the market structure or market environment of a particular auction. In addition, the automatic decision support system 10 provides the optimal values of any subset of the decision variables or candidates based on an evaluation criterion specified by the user of the system 10 conditional on the levels of the remaining decisions.

The available data to the automatic decision support system 10 include data supplied by the user of the system 10. The data include description of the item to be auctioned, auction decision candidates, constraints, and auction evaluation criterion. These are user inputs to the automatic decision support system 10. The available data also include historical auction data and bidding model data. The historical auction data and the bidding model data are stored in the automatic decision support system 10.

The automatic decision support system 10 receives the user inputs of the description of the item to be auctioned, the auction decision candidates, the constraints, and the auction evaluation criterion. The automatic decision support system 10 then selects the best auction decision candidates (e.g., the best auction format is English, the reserve price is $100, the entry fee is $5, and the duration is five days) among the inputted auction decision candidates based on the auction evaluation criterion and the estimated market structure of the auction.

The term "market structure" is a well known term in the field of econometrics. It means substantially the same as the term "auction environment" (or market environment). Thus, these terms are interchangeable. The term "market structure" indicates, in the auction context, environmental factors or conditions that may affect potential bidders in the actual bidding during the auction (or in the auction-related decision making process). In other words, the market structure indicates the factors that may affect a bidder in decisions related to the auction. This term also covers the structure of private information held by bidders of the auction. The private information specifies any information held privately by a bidder or potential bidder (i.e., information not possessed by other bidders or seller). Typically, a bidder's willingness to pay for the auctioned item is known only by the bidder himself/herself. Another example of the market structure may be the results of privately conducted tests obtained by individual bidders before the auctioning of an item, like an oil and gas contract. In this case, the value of the auctioned item may be the same for every bidder, but each bidder has a private estimate of what that value may be. Another example of the market structure is that the current capacity utilization of company bidding for a contract is typically known by the company itself and not by rival bidders. The market structure affects bidding behavior of bidders during the auction.

As is known, bidding behavior determines the outcome of an auction. The outcome of an auction means who gets what and who pays how much, etc. Different auction rules induce different bidding behavior on the part of bidders. A bidder's behavior under a given set of auction rules in turn is determined by his private information. The structure of private information held by bidders is thus a key factor in evaluating alternative auction procedures (e.g., auction format, reserve prices, entry fees, timing and duration of the auction, quantity, participation rules, and information rules, etc.) from the point of view of a seller (or buyer) trying to sell (or procure) an item by auctioning. This fundamental element of an auction environment is not directly observable and has to be estimated from observable and available data. The auction procedures can also be referred to as auction mechanisms. They include the characteristics of the auction.

In accordance with one embodiment of the present invention, the automatic decision support system 10 estimates the unknown or unobservable elements of the market structure of the auction by extracting the joint distribution of private information of the bidders (e.g., the probability distribution of bidders' willingness to pay, the probability distribution of the number of potential bidders) from bid data extracted from the historical auction data of similar auctions. In particular, the automatic decision support system 10 estimates the unknown elements of the market structure by (1) expressing unobservable variables in the bidding model in terms of the observable bid data, and (2) applying known statistical density estimation techniques to the expression so as to obtain an estimation of the unknown elements. In doing so, the automatic decision support system 10 enables the user (either a seller or a buyer) of the system 10 to factor the distribution of bidders' private information into his/her decisions regarding the appropriate auction procedure to conduct the auction.

With the estimated unknown elements of the market structure and other user inputs (e.g., the auction design candidates, evaluation criterion), the automatic decision support system 10 provides optimized auction design candidates based on the evaluation criterion provided such that maximized expected revenue or profit from the auction can be achieved. This means that the automatic decision support system 10 can be used to configure optimized auction parameters for a multiplicity of performance criteria. This also means that the automatic decision support system 10 can be used to configure auction parameters for the purpose of demand estimation. Thus, even if seller/buyer chooses not to use auctions for selling or buying, properly configured auctions can provide both rich source of data and novel estimation methodologies for demand estimation for the item. The structure and operation of the automatic decision support system 10 will be described in more detail below, also in conjunction with FIGS. 1 through 10.

As can be seen from FIG. 1, the automatic decision support system 10 includes a historical auction data repository 11, a bidding model repository 12, a structure extractor 13, a behavior predictor 14, and an optimizer 15. The historical auction data repository 11 stores the historical auction data for previous auctions. The historical auction data specify auction characteristics and/or mechanisms of previous auctions. This means that the historical auction data include the bid data and the auction characteristics data of each of the stored previous auctions. The auction characteristics data specify the auction procedure of the auction. Thus, the auction characteristics data of an auction describe the reserve price of the auctioned item, the auction format, the number of bidders, etc. of the particular auction. The bid data of an auction describe the bidding behaviors of bidders in the auction. The bid data is a record that typically contains the auction identifier, number of bidders N, number of bids, transaction price, winner, reserve price, auction format, item characteristics, bidder characteristics. Both the bid data and the auction characteristics data are extracted from the auction data of the previous or historical auctions for various items. The historical auction data repository 11 can be implemented using any known database technology.

The bidding model repository 12 stores various bidding models. A bidding model specifies a bidding behavior pattern. It is a function of auction characteristics or procedure of the corresponding auction. It is also a function of the market structure of the auction. For example, a Dutch auction bidding model specifies bidding behavior in a Dutch format auction. An English auction bidding model specifies bidding behavior in an English format auction. A first-price-sealed-bid auction bidding model specifies bidding behavior in a first-price-sealed-bid auction. The bidding model repository 12 can be implemented using any known database technology.

The following is an example of a known bidding model. When an auction specified by its auction characteristics data is a first-price-sealed-bid auction with reserve price R, N bidders, and market structure $F(V_1, V_2, \ldots, V_n)$, the bidding model is expressed as $$b(V_i, R, N, F) = V - \int_{\underline{V}}^{V_i} L(\alpha|V_i)\,d\alpha$$

wherein $V_i$ is the valuation of bidder number i, and $L(\alpha|V)$ is further expressed in terms of $F(V_1, V_2, \ldots, V_n)$. This expression was first described by P. Milgrom and R. Weber in 1982 in an article entitled "A Theory of Auction and Competitive Bidding", published in *Econometrica*. Here, $F(V_1, V_2, \ldots, V_n)$ represents the joint distributions of the N bidders' valuations. For a sealed-bid-second-price auction with private valuations, the $L(\alpha|V_i)$ is zero and the bidding model $b(V_i, R, N, F)$ is $V_i$.

The structure extractor 13 is used to estimate the unknown elements of the market structure of the auction. The structure extractor 13 first receives the user input of the item (and its characteristics) to be auctioned. The structure extractor 13 then accesses the repository 11 for the bid data and auction characteristics data observed in previous or historical auctions of similar items of the item. The structure extractor 13 is connected to the historical auction data repository 11 and the bidding model repository 12. The structure extractor 13 then produces a non-parametric structural estimate of the unobservable latent structure of the environment of the auction. The structure extractor 13 uses auction theory and non-parametric statistical methods to extract an estimate of the latent structure from the previously observed bids. The structure and operation of the structure extractor 13 will be described in more detail below, also in conjunction with FIGS. 2 and 5-7.

Figure 2:
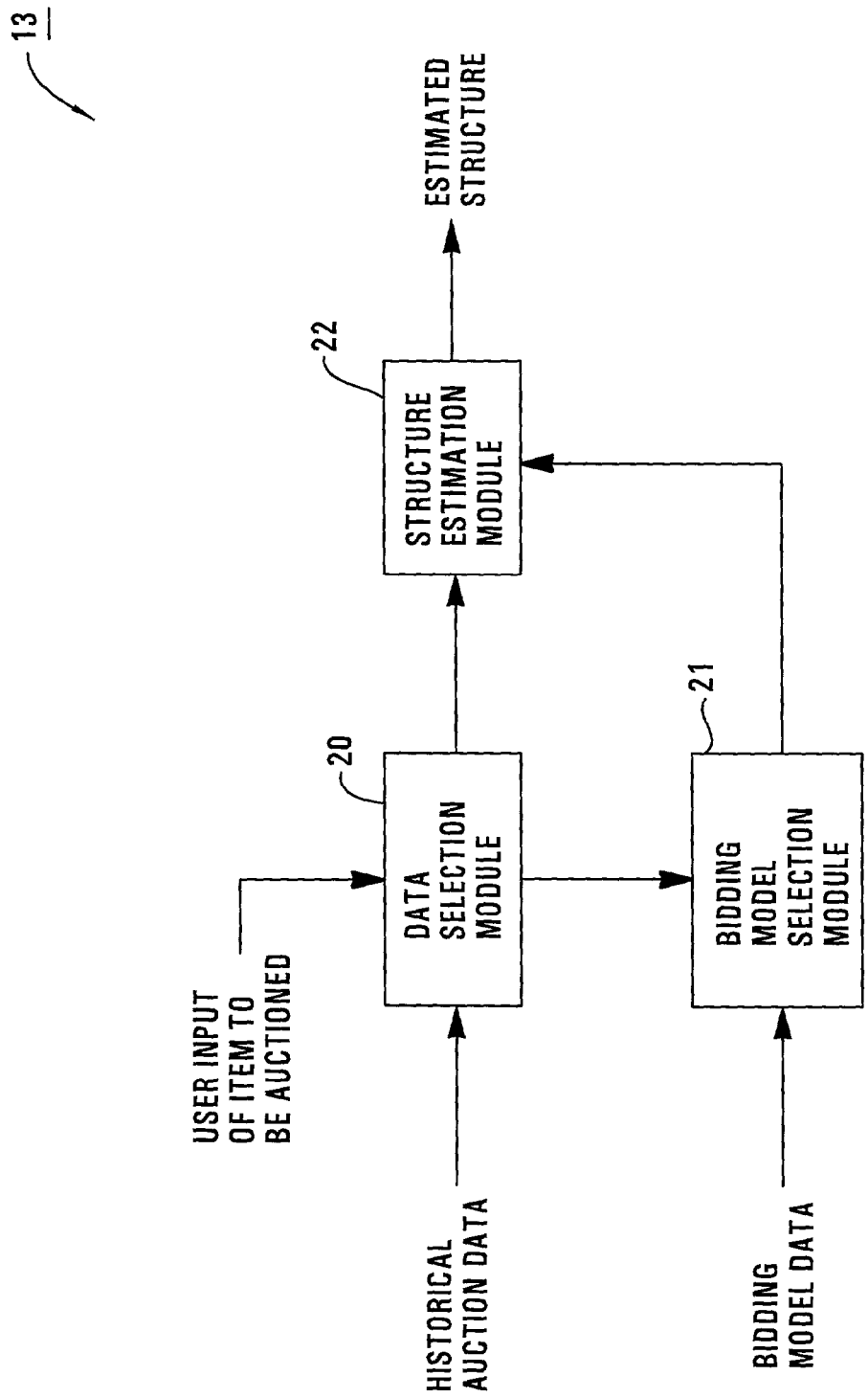
FIG. 2 shows in block diagram form the structure of the structure extractor of the decision support system of FIG. 1.

Referring to FIG. 2, the structure extractor 13 includes a data selection module 20, a bidding model selection module 21, and a structure estimation module 22. The data selection module 20 includes a user interface (not shown) that allows the data selection module 20 to receive user input of the item to be auctioned. The user input also includes the characteristics data of the item to be auctioned. This allows the data selection module 20 to obtain from the repository 11 (FIG. 1) the auction characteristics data and the bid data of the previously observed auctions of the same or similar items of the item to be auctioned.

Figure 5:
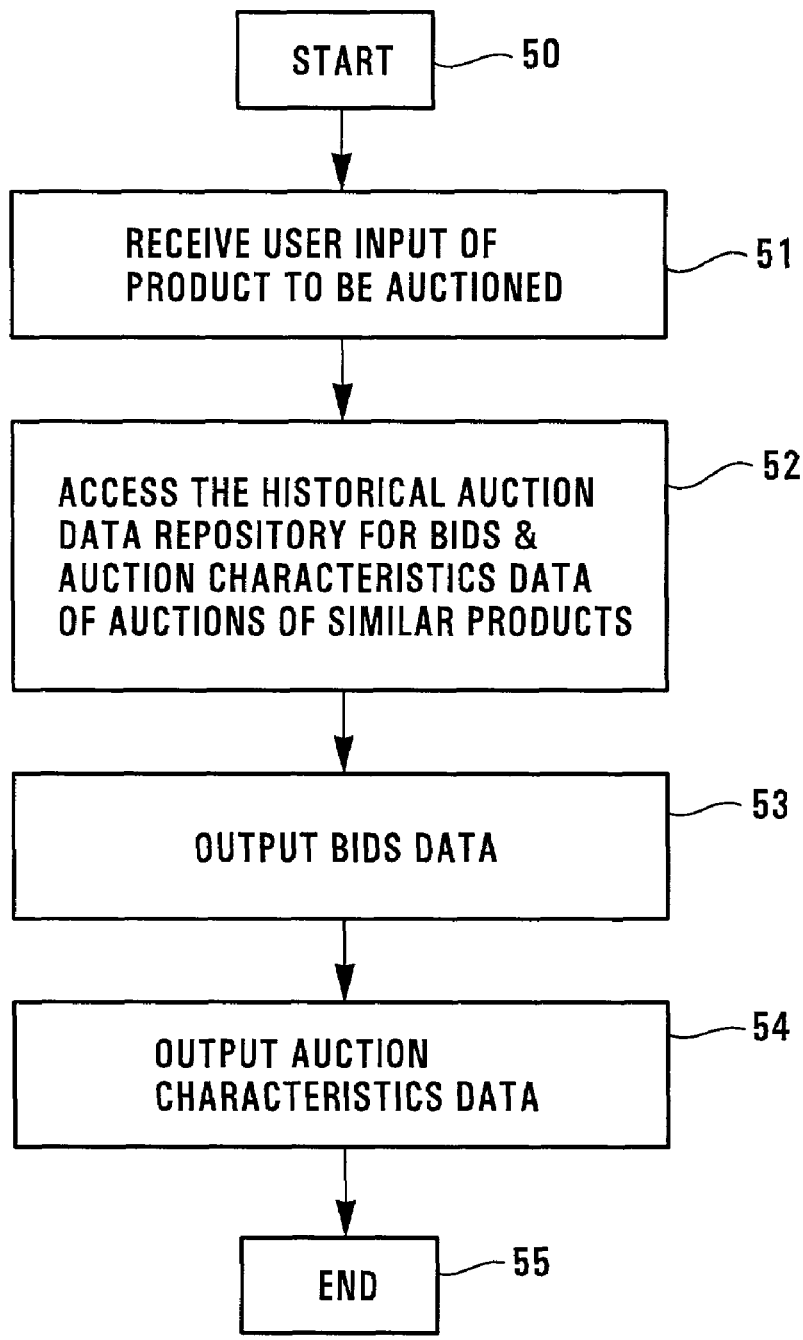
FIG. 5 is a flow chart diagram showing the process of the data selection module of the structure extractor of FIG. 2.

The data selection module 20 then accesses the repository 11 (FIG. 1) for the bid data and the auction characteristics data of the previously observed auctions for the same or similar items. The characteristics of the item to be auctioned allows the data selection module 20 to find the previously observed auctions for the similar items in the repository 11 of FIG. 1. For example, if the item to be auctioned is a printer, the characteristics data of the item will specify model number or configuration of the printer (e.g., D4864, D4864A, D4895, etc.). As a further example, the characteristics data of the item can specify the function or property of the item to be auctioned such that the data selection module 20 can identify the similar items using the characteristics data. FIG. 5 shows the operation of the data selection module 20, which will be described in more detail below.

Figure 6:
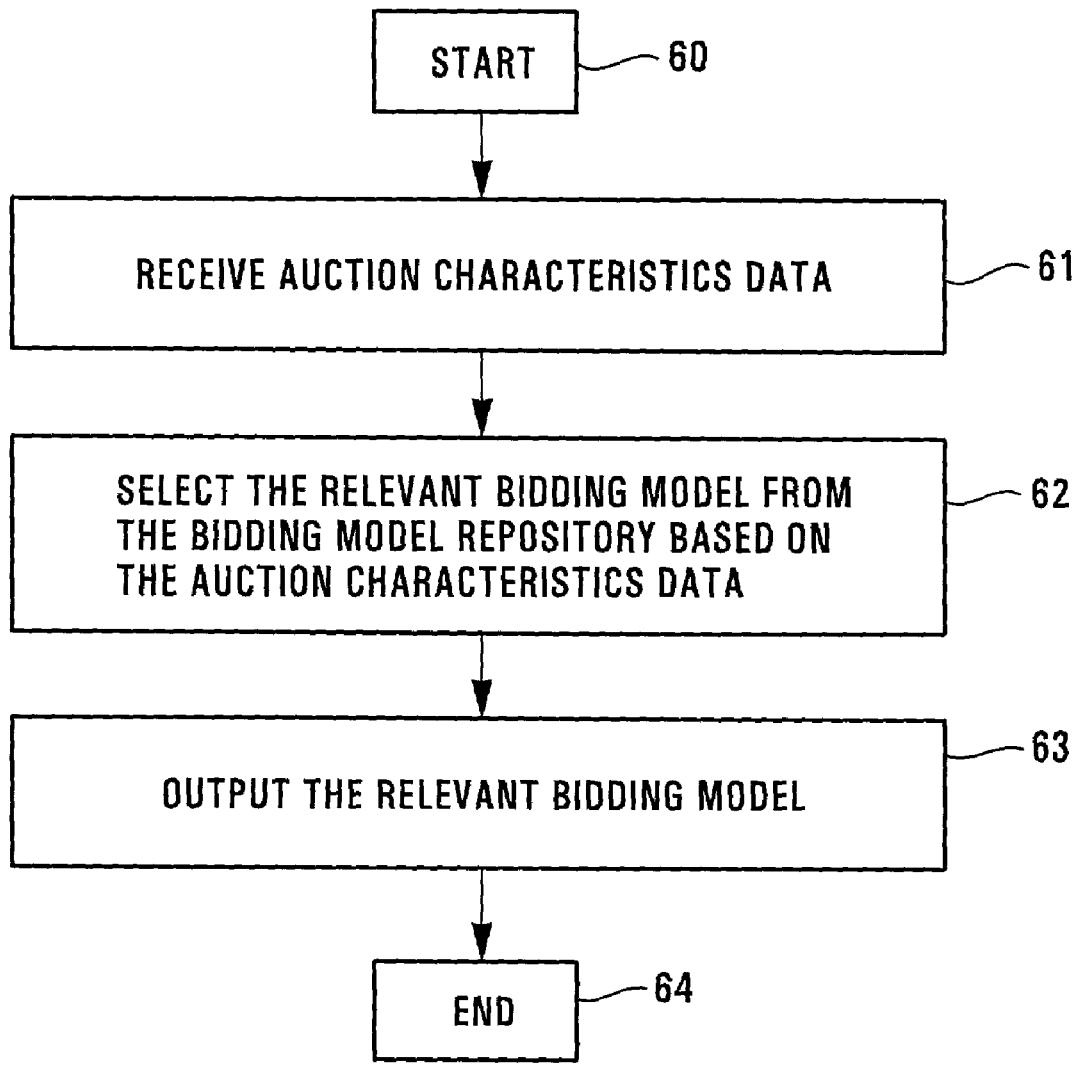
FIG. 6 is a flow chart diagram showing the process of the bidding model selection module of the structure extractor of FIG. 2.

The bidding model selection module 21 uses the auction characteristics data to access the repository 12 to select the appropriate or relevant bidding model or models. This means that the bidding model selection module 21 will select any bidding model(s) matching the auction characteristics data. FIG. 6 shows the operation of the bidding model selection module 21, which will be described in more detail below.

The structure estimation module 22 is the main module that provides the estimation using known structural econometric techniques and known statistical techniques as described above. The structure estimation module 22 receives the bid data from the data selection module 20 and the bidding model (or models) from the bidding model selection module 21. The structure estimation module 22 applies the bid data to the bidding model to invert the bidding model so as to express unobservable or unknown variables in terms of observable bid data. Then the structure estimation module 22 applies known statistical density estimation techniques to the expression so as to obtain an estimate of the structure.

Figure 7:
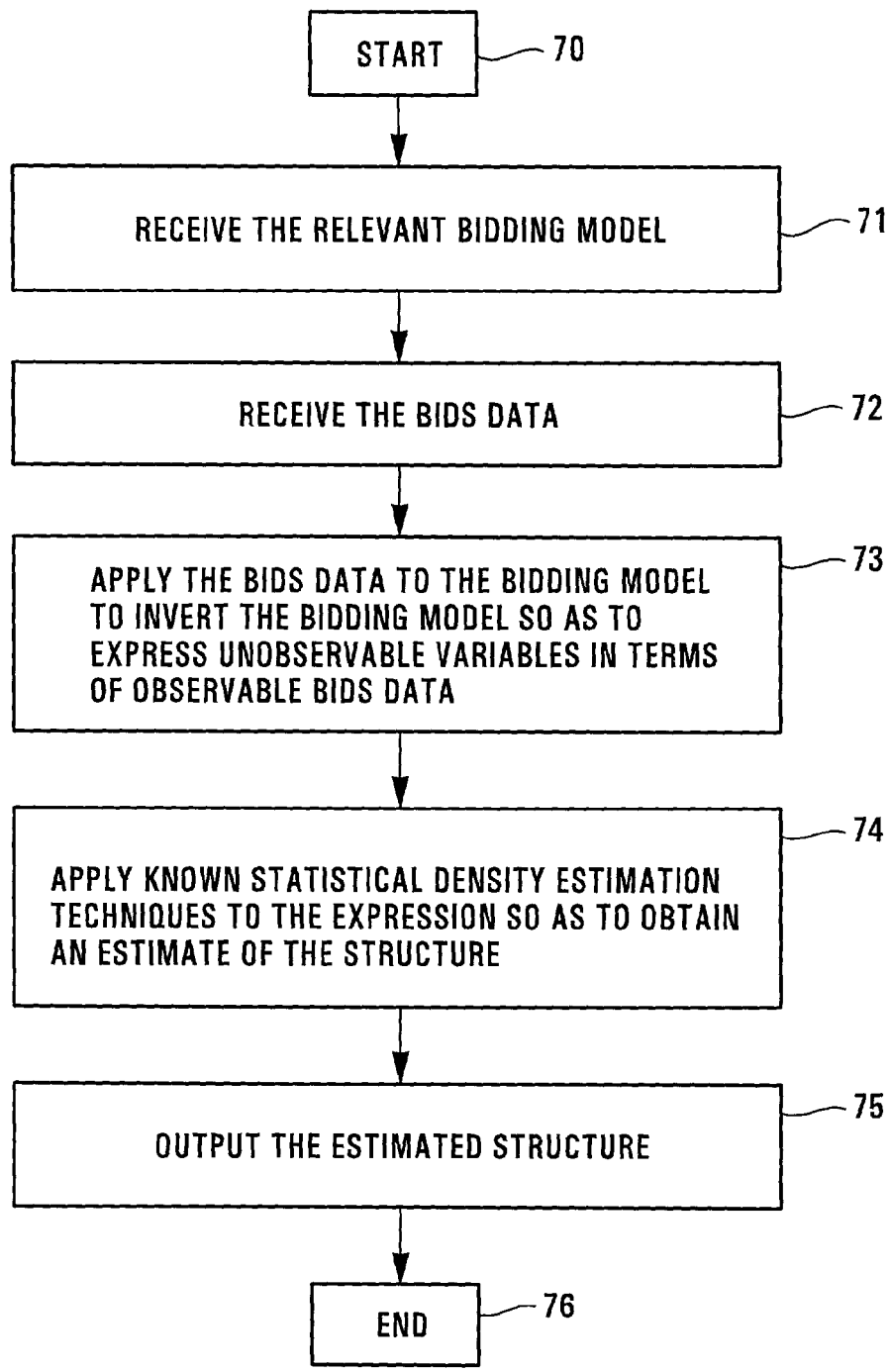
FIG. 7 is a flow chart diagram showing the structure estimation module of the structure extractor of FIG. 2.

In other words, the structure estimation module 22 first identifies unknown structural elements of the auction environments for the item to be auctioned that can be estimated by using the available data. These data are distributions of bidders' private information, risk attitudes of bidders, and distribution of bidder entry cost and other random elements. Then the structure estimation module 22 estimates the latent unknown structural elements using a variety of structural econometric methods that link the observable data to the latent structural elements using the bidding model identified for each item to be auctioned. FIG. 7 shows the operation of the structure estimation module 22, which will be described in more detail below.

FIG. 5 shows in flow chart diagram form the process of the data selection module 20 of FIG. 2. The process starts at the step 50. At the step 51, the data selection module 20 receives the user input of the item to be auctioned. At the step 52, the data selection module 20 accesses the repository 11 (FIG. 1) to extract the bid data and auction characteristics data of previous auctions of the same or similar items. At the steps 53 and 54, the bid data and the auction characteristics data are sent out. The bid data are sent to the structure estimation module 22 and the auction characteristics data are sent to the bidding model selection module 21. The process then ends at the step 55.

FIG. 6 shows in flow chart diagram form the process of the bidding model selection module 21 of FIG. 2. The process starts at the step 60. At the step 61, the bidding model selection module 21 receives the auction characteristics data from the data selection module 20 of FIG. 2. At the step 62, the bidding model selection module 21 selects the relevant bidding model from the repository 12 (FIG. 1) based on the auction characteristics data. This means that the bidding model selection module 21 selects a bidding model that matches the auction characteristics data from the repository 12. At the step 63, the bidding model is sent to structure estimation module 22 (FIG. 2).

FIG. 7 shows in flow chart diagram form the process of the structure estimation module 22 of FIG. 2. The process starts at the step 70. At the steps 71-72, the structure estimation module 22 receives the relevant bidding model and the bid data. At the step 73, the structure estimation module 22 applies the bid data to the bidding model to invert the bidding model so as to express unobservable or unknown variables in terms of observable bid data. At the step 74, the structure estimation module 22 applies known statistical density estimation techniques to the expression so as to obtain an estimate of the structure. At the step 75, the estimated structure is outputted.

Below is an example of how the structure estimation module 22 of FIG. 2 obtains the estimated market structure in terms of observable bid data. Assume the bidding model received in the structure estimation module 22 is a first-price-sealed-bid auction with reserve price R, N bidders, and market structure $F(V_1, V_2, \ldots, V_n)$. This means that the bidding model function can be expressed as $$b(V_i, R, N, F) = \alpha V_i$$

wherein F is the unknown structural element (i.e., market structure) and $V_i$ is a typical bidder's evaluation. Here, $\alpha$ is a constant (e.g., 0.5). In this case, if a bid is 100 (i.e., b=100), then $V_i$=100/0.5=200. So, a bid data set with bids $(b_1, b_2, \ldots, b_n)$ can be converted to a valuation data set $(V_1, V_2, \ldots, V_n)$. Then the estimation module 22 of FIG. 2 uses standard (or known) statistical density estimation techniques can to obtain the unknown structure element $F(V_1, V_2, \ldots, V_n)$.

Referring back to FIG. 1, the bidding behavior predictor 14 predicts bidding behaviors of bidders in the auction based on the user inputs of a set of auction decision candidates and constraints. The bidding behavior predictor 14 receives the estimated unknown elements of the market structure from the structure extractor 13. In addition, the behavior predictor 14 receives the user inputs of auction decision candidates and constraints.

The auction decision candidates are candidates for evaluation by the system 10. For example, one auction decision candidate may be a Dutch auction with a reserve price $R_P$ between $100 and $300 for printer (i.e., the item to be auctioned). Another auction decision candidate may be an English auction with a reserve price $R_P$ between $75 and $200 for printer.

The constraints specify limitations on the non-auction-format auction parameters. For example, one of the constraints supplied to the behavior predictor 14 can be that bidders must be invited for the Dutch auction of the printer. Another constraint may be that bidders for the English auction need not be invited to participate in the auction.

The behavior predictor 14 uses the received auction decision candidates and the constraints to access the repository 12 in order to receive the bidding model or models that match the auction decision candidates. Then the behavior predictor 14 applies the estimated structure elements to the bidding model or models to obtain the bidding behavior prediction for each of the auction decision candidates. The structure and operation of the behavior predictor 14 will be described in more detail below, also in conjunction with FIGS. 3 and 8.

Figure 3:
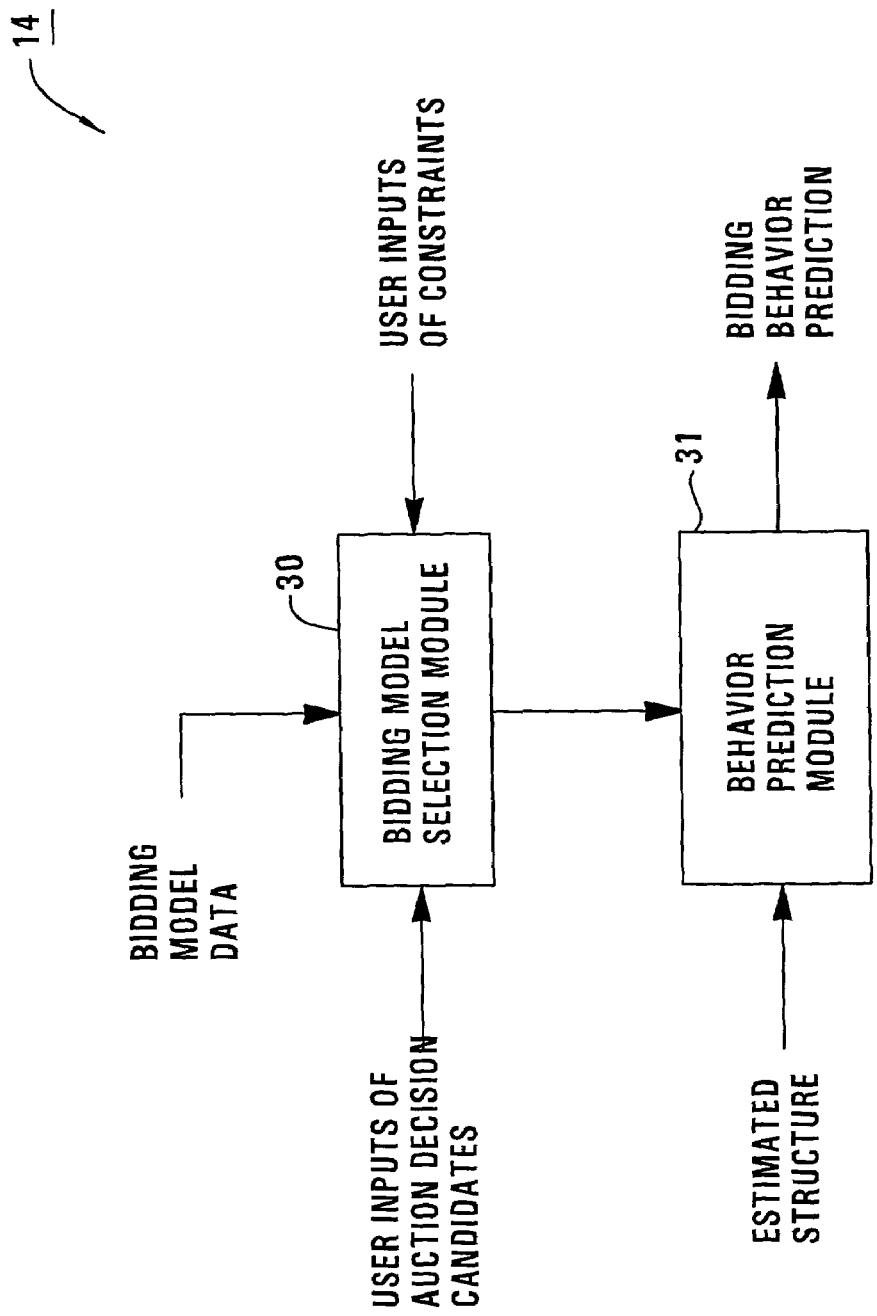
FIG. 3 shows in block diagram form the structure of the behavior predictor of the decision support system of FIG. 1.

Referring to FIG. 3, the behavior predictor 14 includes a bidding model selection module 30 and a behavior prediction module 31. The bidding model selection module 30 is connected to the repository 12 of FIG. 1 to receive selected bidding model or models based on the auction decision candidates and the constraints. The structure and operation of the bidding model selection module 30 is substantially the same as the bidding model selection module 21 of FIG. 2. One difference is that the bidding model selection module 30 also receives constraints, which affects the selection of the bidding model based on the auction decision candidates. Thus, the bidding model selection module 30 will not be described in more detail.

The behavior prediction module 31 estimates or predicts the expected bidders' behaviors for each of the auction decision candidates. The behavior prediction module 31 does this by (1) identifying a particular auction decision candidate, (2) identifying the appropriate bidding model supplied from the bidding model selection module 30 for that auction decision candidate, and (3) then substituting the estimated structure elements obtained from the structure estimation module 22 of FIG. 2 into the bidding model to obtain the bidding behavior prediction for that particular auction decision candidate.

Figure 8:
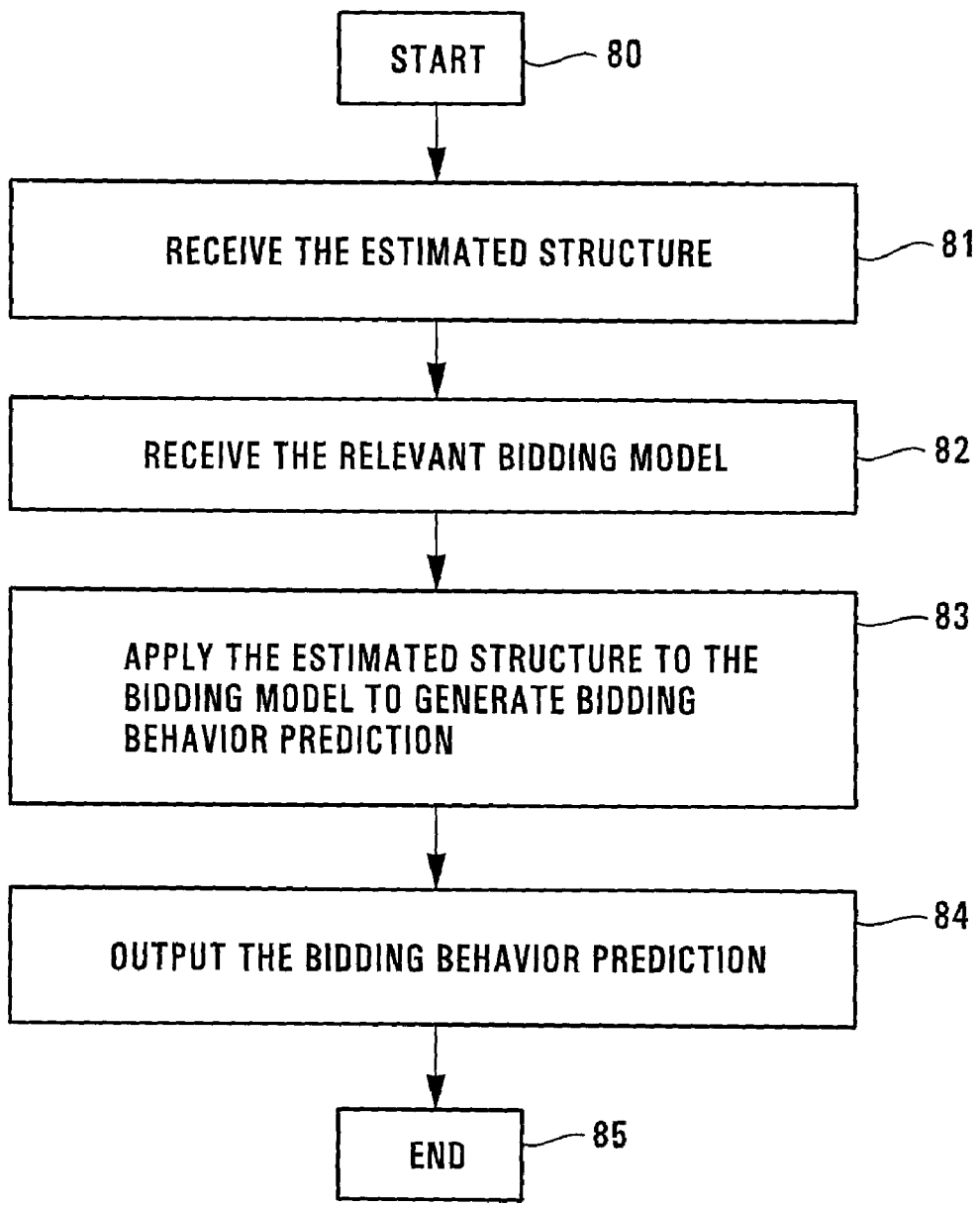
FIG. 8 is a flow chart diagram showing the behavior prediction module of the behavior predictor of FIG. 3.

FIG. 8 shows in flow chart diagram form the process of the behavior prediction module 31 of FIG. 3. The process starts at the step 80. At the steps 81-82, the behavior prediction module 31 receives the estimated structure from the structure estimation module 22 of FIG. 2, and the relevant bidding model (or models) from the bidding model selection module 30. At the step 83, the behavior prediction module 31 applies the estimated structure to the bidding model (or models) to generate the bidding behavior prediction. The prediction is passed to the optimizer 15 of FIG. 1.

Figure 4:
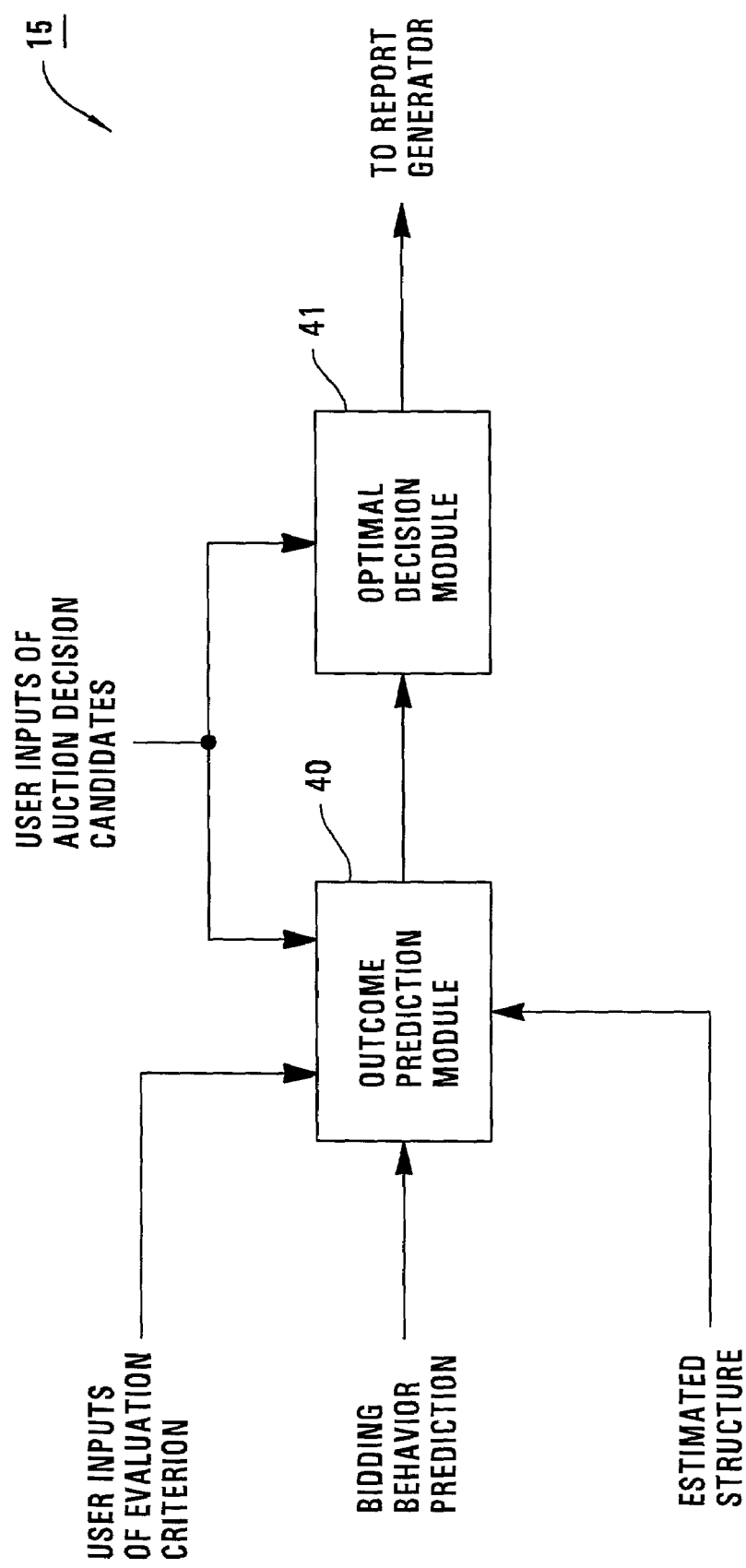
FIG. 4 shows in block diagram form the structure of the optimizer of the decision support system of FIG. 1.

Referring back to FIG. 1, the optimizer 15 is used to evaluate each auction decision candidate provided by the user in accordance with evaluation criterion also provided by the user of the system 10. The optimizer 15 employs the evaluation criterion provided by the user to generate an evaluation of each of the auction design candidates based on (1) the estimated unknown elements of the market structure and (2) the predicted bidding behavior of bidders. Examples of the evaluation criteria include expected profit, probability of sale, expected efficiency, etc. FIG. 4 shows the structure of the optimizer 15, which will be described in more detail below.

In FIG. 4, the optimizer 15 includes an outcome prediction module 40 and an optimal decision module 41. The outcome prediction module 40 receives the user inputs of the evaluation criterion and the auction decision candidates. The outcome prediction module 40 also receives the bidding behavior prediction from the behavior prediction module 31 of FIG. 3, and the estimated structure from the structure estimation module 22 of FIG. 2. The outcome prediction module 40 formulates for each item to be auctioned, a functional relationship between (1) the values of the evaluation criterion, (2) the auction format and other auction parameters, (3) the bidders' behavior implied by the bidding model, (4) the estimated structure elements, and (5) the valuation of the item to be auctioned. The outcome prediction module 40 then estimates the expected values of the evaluation criterion for each of alternative formats by (1) substituting the predicted bidder behavior from the bidding model, and (2) substituting the estimated structure elements from the bidding model.

The optimal decision module 41 calculates the optimized expected values of the evaluation criterion for each of the auction decision candidates by selecting the values of other auction parameters, subject to the constraints.

Figure 9:
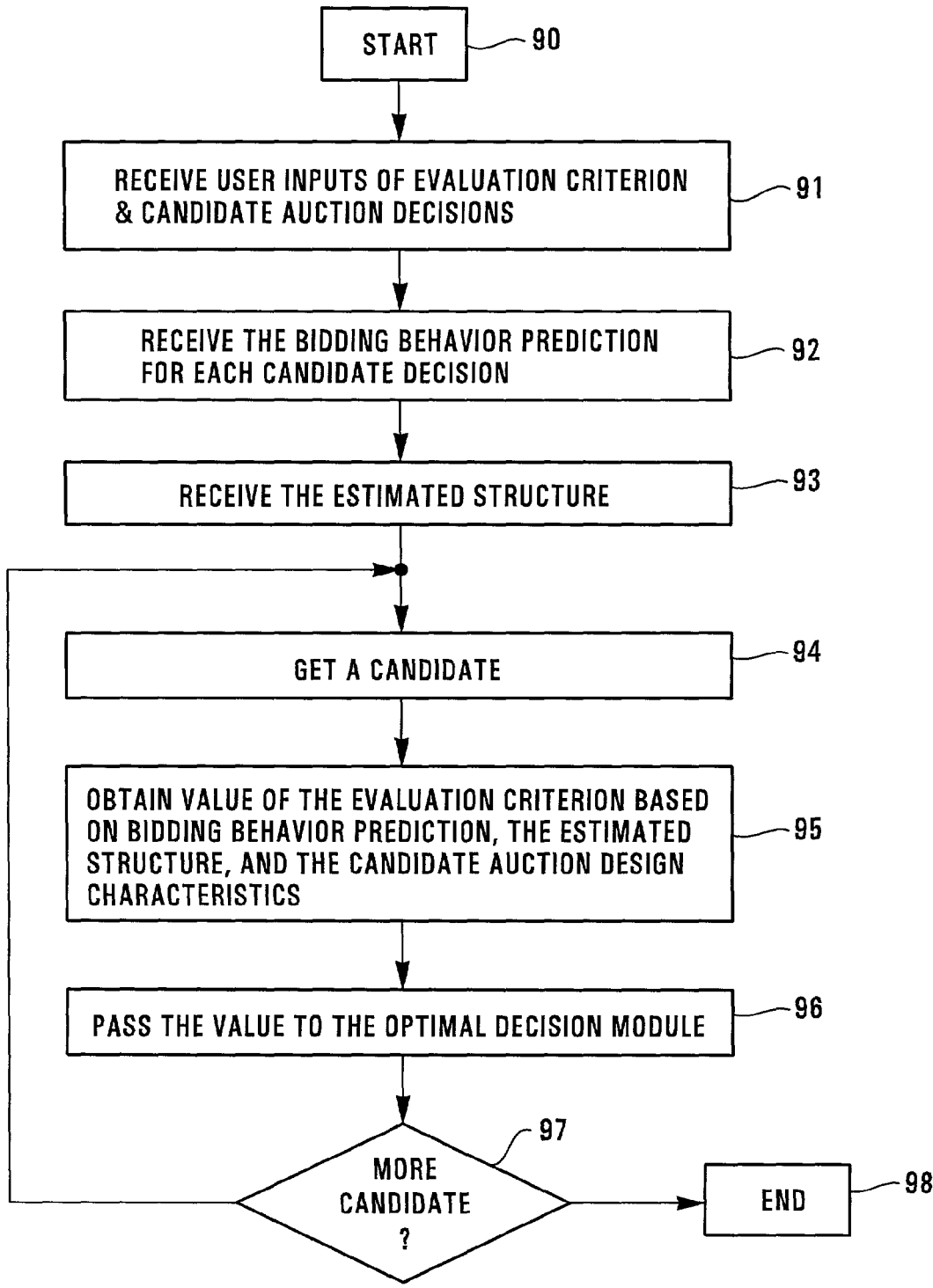
FIG. 9 is a flow chart diagram showing the output prediction module of the optimizer of FIG. 4.

FIG. 9 shows the process of the outcome prediction module 40. The process starts at the step 90. At the steps 91-93, the outcome prediction module 40 receives all the input data (e.g., the estimated structure, the bidding behavior prediction, the evaluation criterion, etc). At the step 94, the outcome prediction module 40 gets a candidate. At the step 95, the outcome prediction module 40 obtains value of the evaluation criterion based on the bidding behavior prediction, the estimated structure (or estimated structural elements), and the candidate auction design characteristics. At the step 96, the value is passed to the optimal decision module 41. Then the process cycles back to the step 94 at the step 97 if more candidates are to be processed. Otherwise, the process ends at the step 98.

Figure 10:
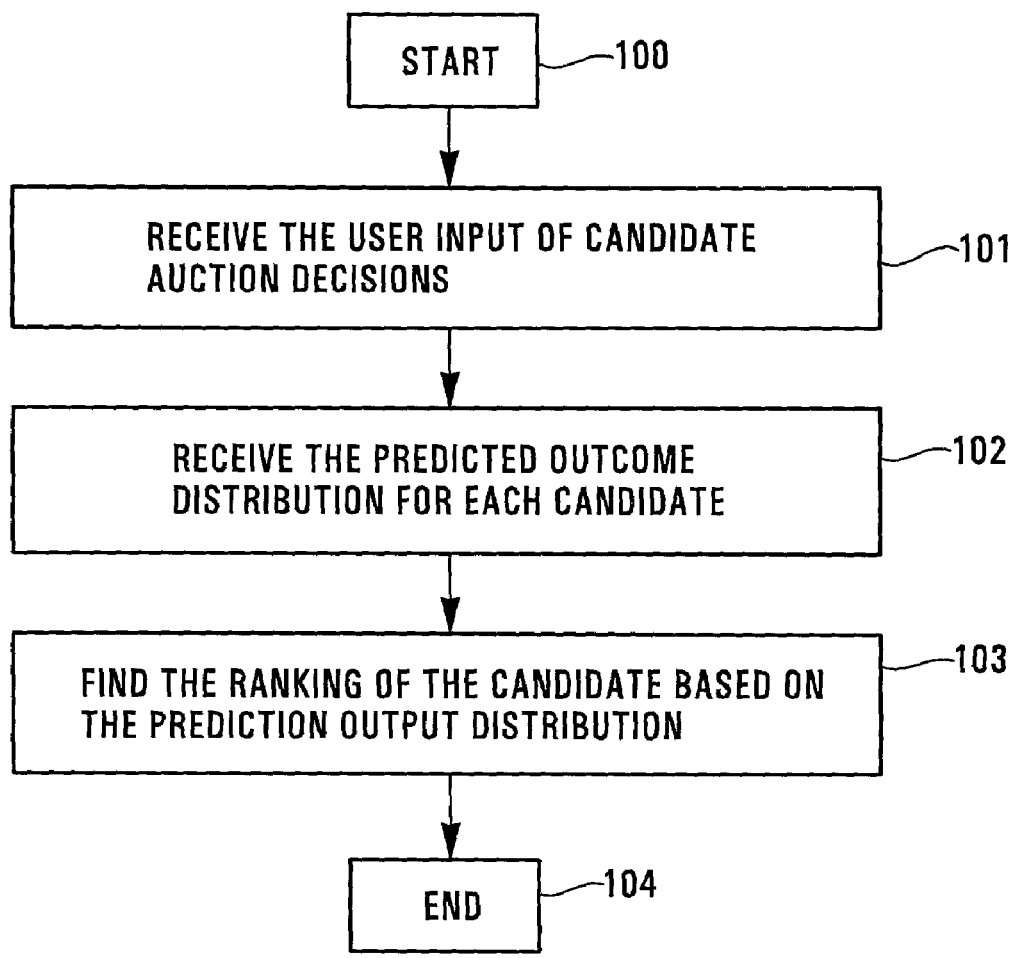
FIG. 10 is a flow chart diagram showing the optimal decision module of the optimizer of FIG. 4.

FIG. 10 shows the process of the optimal decision module 41. As can be seen from FIG. 10, the process starts at the step 100. The steps 101-102 indicate that the optimal decision module 41 receives the user input of the candidates and the predicted outcome distribution for each candidate. At the step 103, the optimal decision module 41 finds the ranking of the candidate decisions based on the predicted outcome distribution.

Referring back to FIG. 1, the output of the optimizer 15 of the automatic decision support system 10 is sent to a report generator 16 that generates the final report readable by the user of the automatic decision support system 10. The function of the report generator 16 is to gather the evaluation results regarding each auction design candidate supplied by the user of the automatic decision support system 10. The report generator 16 then compiles the evaluation results together into the final report. The report generator 16 can be implemented using known technology.

In addition, the evaluation results of the auction design candidates can be sent to an external auction implementation system (not shown in FIG. 1) to implement the auction using the best design candidates. In this case, the optimizer 15 selects the best auction design candidate based on the evaluation results of the design candidates. The selected best design candidate is then supplied to the external auction implementation system to implement the auction. One way of transmitting the selected best design candidate is through Internet. Alternatively, other known communication means can be employed to allow the transmission of the selected best design candidate from the optimizer 15 to the external auction implementation system.

In one embodiment, the automatic decision support system 10 includes report generator 16. In an alternative embodiment, the automatic decision support system 10 does not have the report generator 16. Instead, the output of the optimizer 15 is sent to the external auction implementation system. In a further alternative embodiment, the automatic decision support system 10 includes the report generator 16 and the output of the optimizer 15 can also be sent to the external auction implementation system.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A computer-implemented automated decision support system for designing an auction for a given item, comprising:
   a computer;
   a structure extractor that estimates unknown elements of market structure of the auction based on auction characteristics data extracted from historical auctions for similar items and a bidding model matching the extracted auction characteristics data;
   a bidding behavior predictor that predicts bidding behaviors of bidders in the auction based on the estimated unknown elements of market structure and characteristics of the auction;
   an optimizer that employs an evaluation criterion to generate an evaluation of the auction based on (1) the estimated unknown elements of market structure and (2) the predicted bidding behavior of bidders.

2. The system of claim 1, further comprising a report generator coupled to the optimizer and the structure extractor to generate a report from the evaluation of the auction.

3. The system of claim 1, wherein the optimizer selects the best auction design candidates from the evaluation of the auction, and sends these best auction design candidates to an external auction implementation system to implement the auction.

4. The system of claim 3, wherein the optimizer sends the best auction design candidates to the external auction implementation system via the Internet.

5. The system of claim 1, further comprising
- a historical auction data repository that stores historical auction data for a plurality of historical auctions of a plurality of items, including items similar to the given item;
- a bidding model repository that stores a plurality of bidding models.

6. The system of claim 1, wherein the structure extractor further comprises
- a data selection module that accesses an external historical auction data repository for the auction characteristics data of the historical auctions for the items similar to the given item based on an user input of the given item to be auctioned;
- a bidding model selection module that selects, from an external bidding model repository, the bidding model matching the auction characteristics data;
- a structure estimation module that combines the extracted auction characteristics data and the bidding model to estimate the unknown elements of market structure of the auction.

7. The system of claim 6, wherein the auction characteristics data are part of auction mechanism data that also include bid data, wherein the structure estimator estimates the unknown elements by
- applying the bid data to the bidding model to invert the bidding model so as to express unobservable variables in the bidding model in terms of the bid data;
- applying a statistical density estimation technique to the expression so as to obtain an estimate of the unknown elements.

8. The system of claim 1, wherein the behavior predictor further comprises
- a bidding model selection module that selects, from an external bidding model repository, the bidding model matching the characteristics of the auction, wherein the characteristics of the auction is a user input;
- a behavior prediction module that predicts the bidding behaviors of bidders in the auction by applying the estimated unknown elements of market structure into the extracted bidding model matching the user input of auction characteristics of the auction.

9. The system of claim 1, wherein the optimizer further comprises
- an outcome prediction module that receives a user input evaluation criterion and a user input of auction decision candidates to provide prediction for each of the auction decision candidates using the evaluation criterion and based on (1) the estimated unknown elements and (2) the predicted bidding behavior of bidders;
- an optimal decision module that ranks the evaluation for each of the auction decision candidates.

10. A computer-implemented method for providing an automated auction analysis, comprising:
- estimating, by a computer, unknown elements of market structure of the auction based on auction characteristics data extracted from historical auctions for similar items and a bidding model matching the extracted auction characteristics data;
- predicting, by the computer, bidding behaviors of bidders in the auction based on the estimated unknown elements of market structure and characteristics of the auction;
- employing an evaluation criterion to generate an evaluation of the auction based on (1) the estimated unknown elements of market structure and (2) the predicted bidding behavior of bidders.

11. The method of claim 10, further comprising the step of generating a report from the evaluation of the auction.

12. The method of claim 10, further comprising the steps of
- selecting the best auction design candidates from the evaluation of the auction;
- sending these best auction design candidates to an external auction implementation system to implement the auction.

13. The method of claim 12, wherein the best auction design candidates are sent to the external auction implementation system via the Internet.

14. The method of claim 10, wherein the step of estimating the unknown elements of market structure of the auction further comprises
- accessing an external historical auction data repository for the auction characteristics data of the historical auctions for the items similar to the given item based on an user input of the given item to be auctioned;
- selecting, from an external bidding model repository, the bidding model matching the auction characteristics data;
- combining the extracted auction characteristics data and the bidding model to estimate the unknown elements of market structure of the auction.

15. The method of claim 14, wherein the step of combining the extracted auction characteristics data and the bidding model further comprises the steps of
- applying bid data to the bidding model to invert the bidding model so as to express unobservable variables in the bidding model in terms of the bid data;
- applying a statistical density estimation technique to the expression so as to obtain an estimation of the unknown elements.

16. The method of claim 10, wherein the step of predicting bidding behaviors of bidders in the auction further comprises the steps of
- selecting, from an external bidding model repository, the bidding model matching the characteristics of the auction, wherein the characteristics of the auction is a user input;
- predicting the bidding behaviors of bidders in the auction by applying the estimated unknown elements of market structure into the extracted bidding model matching the user input of auction characteristics of the auction.

17. The method of claim 10, wherein the step of employing an evaluation criterion to generate an evaluation of the auction further comprises the steps of
- receiving a user input evaluation criterion and a user input of candidate auction decisions to provide prediction for each of the candidate auction decisions using the evaluation criterion and based on (1) the estimated unknown elements and (2) the predicted bidding behavior of bidders;
- ranking the evaluation for each of the candidate auction decisions.

18. The system of claim 1, wherein the bidding model comprises one of an English auction bidding model, a Dutch auction bidding model, a first-price-sealed bid bidding model, and a Vickrey auction bidding model.

19. The system of claim 1, wherein the auction characteristics data describe at least a reserve price of the given item, an auction format, and a number of bidders.

20. The system of claim 1, the bidding behavior predictor to receive as input plural auction decision candidates that correspond to different types of auctions, wherein the bidding behavior predictor predicts bidding behaviors for the plural auction decision candidates.

21. The method of claim 10, wherein estimating the unknown elements of the market structure of the auction is based on the bidding model selected from the group consisting of an English auction bidding model, a Dutch auction bidding model, a first-price-sealed bid bidding model, and a Vickrey auction bidding model.

22. The method of claim 10, wherein estimating the unknown elements of the market structure of the auction is based on the auction characteristics data including at least a reserve price of the given item, an auction format, and a number of bidders.

23. The method of claim 10, further comprising receiving as input plural auction decision candidates that refer to different types of auctions, wherein predicting the bidding behaviors comprises predicting bidding behaviors for the plural auction decision candidates.

* * * * *